United States Patent [19]
Kim

[11] Patent Number: 5,327,239
[45] Date of Patent: Jul. 5, 1994

[54] VIDEO DATA SPLITTING CIRCUIT

[75] Inventor: Ki B. Kim, Seoul, Rep. of Korea

[73] Assignee: SamSung Electronics Co., Ltd., Suwon, Rep. of Korea

[21] Appl. No.: 763,295

[22] Filed: Sep. 20, 1991

[30] Foreign Application Priority Data

Nov. 9, 1990 [KR] Rep. of Korea ............... 90-18064

[51] Int. Cl.$^5$ ..................... H04N 5/213; H04N 5/14
[52] U.S. Cl. ............................ 348/607; 348/606
[58] Field of Search ............... 358/167, 166, 36, 37, 358/160; H04N 5/213, 5/14, 5/208

[56] References Cited

U.S. PATENT DOCUMENTS

| | | | |
|---|---|---|---|
| 4,611,231 | 9/1986 | Kobayashi | 358/160 |
| 4,680,658 | 7/1987 | Tatami | 358/36.2 |
| 4,811,097 | 3/1989 | Ritter | 358/167 |
| 4,977,462 | 12/1990 | Takanashi et al. | 358/339 |
| 5,072,315 | 12/1991 | Tsunashima | 360/36.2 |
| 5,249,229 | 9/1993 | Poivet et al. | 380/14 |

Primary Examiner—James J. Groody
Assistant Examiner—Glenton B. Burgess
Attorney, Agent, or Firm—Robert E. Bushnell

[57] ABSTRACT

A video data splitting circuit is disclosed, and the circuit includes a control part and a signal holding and outputting part. The control part includes a sequential address generator, a random address generator, a first selector, an inverter, and a second selector. The signal holding and outputting part includes a first latch, a first memory, a second latch, a third latch, a second memory and a third selector. According to the present invention, the noises added to the transmitting signals are dispersed, so that the final picture at the receiving end should not be affected by the noises.

20 Claims, 4 Drawing Sheets

| ADDRESS / CLOCK NUMBERS | SEQUENTIAL ADDRESS SIGNAL | | | | | | | | | | | | PSEUDO-RANDOM ADDRESS SIGNAL | | | | | | | | | | |
|---|---|---|---|---|---|---|---|---|---|---|---|---|---|---|---|---|---|---|---|---|---|---|---|
| | Q0 | Q1 | Q2 | Q3 | Q4 | Q5 | Q6 | Q7 | Q8 | Q9 | Q10 | Q11 | QA | QB | QC | QD | QE | QF | QG | QH | QI | QJ | QK |
| 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 |
| 1 | 1 | 0 | 0 | 0 | 0 | 0 | 0 | 0 | 0 | 0 | 0 | 1 | 1 | 1 | 0 | 0 | 0 | 0 | 0 | 0 | 0 | 0 | 0 |
| 2 | 0 | 1 | 0 | 0 | 0 | 0 | 0 | 0 | 0 | 0 | 1 | 0 | 1 | 1 | 1 | 0 | 0 | 0 | 0 | 0 | 0 | 0 | 0 |
| 3 | 1 | 1 | 0 | 0 | 0 | 0 | 0 | 0 | 0 | 0 | 1 | 1 | 1 | 1 | 1 | 1 | 0 | 0 | 0 | 0 | 0 | 0 | 0 |
| 4 | 0 | 0 | 1 | 0 | 0 | 0 | 0 | 0 | 1 | 1 | 0 | 0 | 1 | 1 | 1 | 1 | 1 | 0 | 0 | 0 | 0 | 0 | 0 |
| 5 | 1 | 0 | 1 | 0 | 0 | 0 | 0 | 0 | 1 | 1 | 0 | 1 | 1 | 1 | 1 | 1 | 1 | 1 | 0 | 0 | 0 | 0 | 0 |
| 6 | 0 | 1 | 1 | 0 | 0 | 0 | 0 | 0 | 1 | 1 | 1 | 0 | 1 | 1 | 1 | 1 | 1 | 1 | 1 | 0 | 0 | 0 | 0 |
| 7 | 1 | 1 | 1 | 0 | 0 | 0 | 0 | 0 | 1 | 1 | 1 | 1 | 1 | 1 | 1 | 1 | 1 | 1 | 1 | 1 | 0 | 0 | 0 |
| 8 | 0 | 0 | 0 | 1 | 0 | 0 | 0 | 1 | 0 | 0 | 0 | 0 | 1 | 1 | 1 | 1 | 1 | 1 | 1 | 1 | 1 | 0 | 0 |
| 9 | 1 | 0 | 0 | 1 | 0 | 0 | 0 | 1 | 0 | 0 | 0 | 1 | 1 | 1 | 1 | 1 | 1 | 1 | 1 | 1 | 1 | 1 | 0 |
| 10 | 0 | 1 | 0 | 1 | 0 | 0 | 0 | 1 | 0 | 0 | 1 | 0 | 1 | 1 | 1 | 1 | 1 | 1 | 1 | 1 | 1 | 1 | 1 |
| - - - - - | | | | | | - | | | | | | | | | | | - | | | | | | |
| 1279 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 0 |
| 1280(0) | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 |

*FIG. 4*

VIDEO DATA SPLITTING CIRCUIT

FIELD OF THE INVENTION

The present invention relates to a circuit in which data degradations due to various externally generated noises can be prevented during transmission of data from the transmitting end to the receiving end, and particularly to a video data splitting circuit by which noises generated during transmission of high picture quality TV signals can be decreased.

BACKGROUND OF THE INVENTION

In carrying out the television (to be called TV) broadcasting, if video signals are transmitted from the transmitting end, the transmitted signals are affected by various noises such as burst noise, ghost noise and the like before reaching the receiving end, thereby causing degradations of the signals. Consequently, the signals received by the receiving end contain a lot of noises, therefore, if the signals are regenerated, various noises such as ghost noise appear on the picture, thereby deteriorating the resolving power.

In an effort to give a solution to such a problem, there have been conventionally used the ghost canceller, noise reducer and the like, but there are encountered with much difficulties in employing the above devices on a high picture quality TV (advanced TV: ATV). That is, not only the circuit becomes complicated, but the noises can not be completely removed.

SUMMARY OF THE INVENTION

The present invention is intended to overcome the above described disadvantages of the conventional technique.

Therefore it is an object of the present invention to provide a video signal splitting circuit in which the signals are transmitted from the transmitting end in a pseudo-randomly mixed form, and in a form quite different from the original form, and the signals are restored to the original form upon receipt of them by the receiving end, so that, even if the signals are contaminated with noises during the transmission, the noises should be dispersed so as for the influence of the noise to be decreased.

According to the present invention, there is provided a video a video data splitting circuit for removing noises added during the transmission of video signals, said circuit comprising: a control section 20 for generating sequential address signal e and pseudo-random address signals d being generated sequentially on the basis of the period of a horizontal synchronizing signal m after being synchronized with a clock b upon receipt of it for generating a second control signal h by inverting a first control signal c upon receipt of it, for alternately selecting said sequential address signal e and said pseudo-random address signal d by utilizing said first and second control signals c,h for outputting first and second address signals g, f after forming them to be mutually inverse and simultaneously outputting said first and second control signals c,h; and a signal holding and outputting section 10 for latching video signals a upon receipt of them, for receiving said first control signal c said first and second address signals g,f and said second control signal h from said control section 20, for sequentially writing said video signals a into a memory in accordance with the above signals, and for randomly reading and outputting the stored video signals in a scrambled form.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Figure 1:
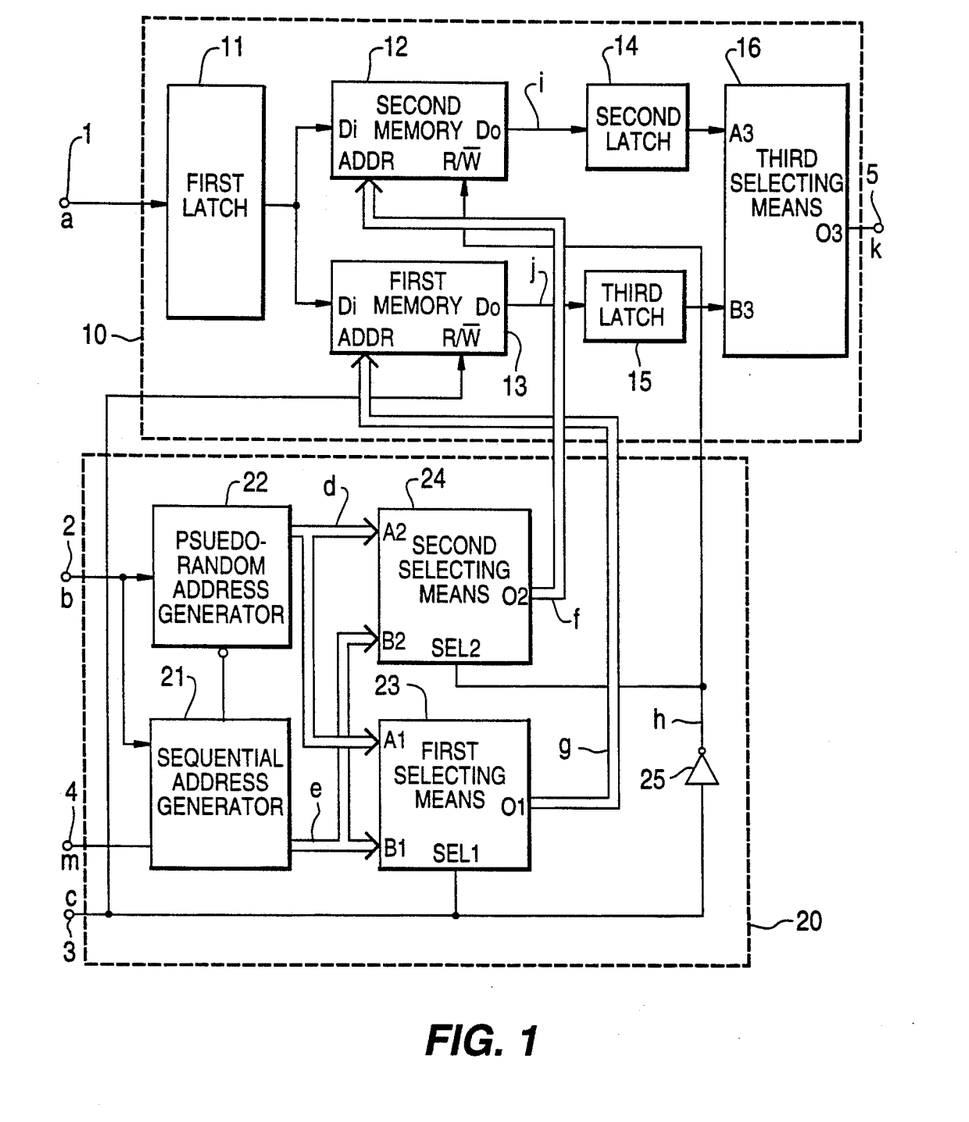
FIG. 1 illustrates a circuit according to the present invention.

FIG. 1 illustrates the circuit according to the present invention. As shown in this drawing, the circuit includes: a clock input terminal 2 for receiving clocks b; a horizontal synchronization signal input terminal 4 for receiving horizontal synchronizing signals m; a video signal input terminal 1 for receiving video signals a; a control section 20 and a signal holding and outputting section 10. The control section 20 generates pseudo-random signals d and sequential address signals e in synchronization with the clock b after receipt of it, and based on the period of the horizontal synchronizing signal m after receipt of it.

Then, the control section 20 generates a second control signal h after receipt of a first control signal c and after inverting it, and alternately selects the sequential address signals e and the pseudo-random signals d in accordance with the first and second control signals.

Further, the control section 20 outputs first and second address signals g,f in such a manner as to give an opposite relation to the selections of the signals e,d, and also outputs the first and second control signals c,h.

The signal holding and outputting section 10 writes sequentially into a memory, and outputs the data in a random manner after reading the data by scrambling them. When writing the data into the memory, the signal holding and outputting section 10 latches the video signals a after receipt of them through the video signal input terminal 1, and writes them into the memory in accordance with the first control signal c, and after receipt of the first and second address signals g,f, and the second control signal h from the control section 20.

The control section 20 includes a sequential address generator 21, a pseudo-random address generator 22, a first selecting means 23, an inverter 25, and a second selecting means 24.

The sequential address generator 21 generates and outputs sequential address signals e based on the period of a horizontal synchronizing signal m and in synchronization with a clock b after receipt of them, and outputs the horizontal synchronizing signals after delaying them.

The pseudo-random address generator 22 generates and outputs pseudo-random address signals d in a dummily random manner based on the period of the horizontal synchronizing signals after receipt of them, and in synchronization with the clock b after receipt of it.

The first selecting means 23 generates and outputs a first address signal g after selecting the sequential address signal e and the random address signal d in accordance with the first control signal c after receipt of the first control signal c, the sequential address signal e, and the pseudo-random address signal d.

The second selecting means 24 generates and outputs a second address signal f after selecting the sequential address signal e and the pseudo-random address signal d in accordance with the second control signal h after receipt of the second control signal h, the sequential address signal e and the pseudo-random address signal d. The inverter 25 inverts the first control signal c after receipt of it, and outputs it in the form of a second control signal h.

The signal holding and outputting section 10 includes: a first latch 11, a first memory 13, a third latch 15, a second memory 12, and a second latch 14.

The first latch 11 latches the received video signals a before outputting them. The first memory 13 sequentially writes the output of the first latch 11 into the designated region in accordance with the first control signal c and after receipt of the first address signal g, the first control signal c and the output of the first latch 11, when the first address signal g is sequentially generated. Under a reading mode, the first memory 13 also randomly reads the outputs of the first latch 11 in accordance with the first control signal c for the designated regions when the first address signal g is randomly generated, before outputting the read data.

The third latch 15 latches the output of the first memory 13 before outputting them. The second memory 12 sequentially writes the output of the first latch 11 into the designated region in accordance with the second control signal h and after receipt of the second address signal f, the second control signal h and the output of the first latch 11, when the second address signal f is sequentially output. Then the second memory section 12 reads and outputs in a random manner the output of the first latch 11 from the designated region in accordance with the second control signal h, when the second address signal f is randomly generated. The second latch 14 latches the output of the second memory 12, before outputting them. The third selecting means 16 selectively outputs of the second and third latches 14, 15.

Figure 2:
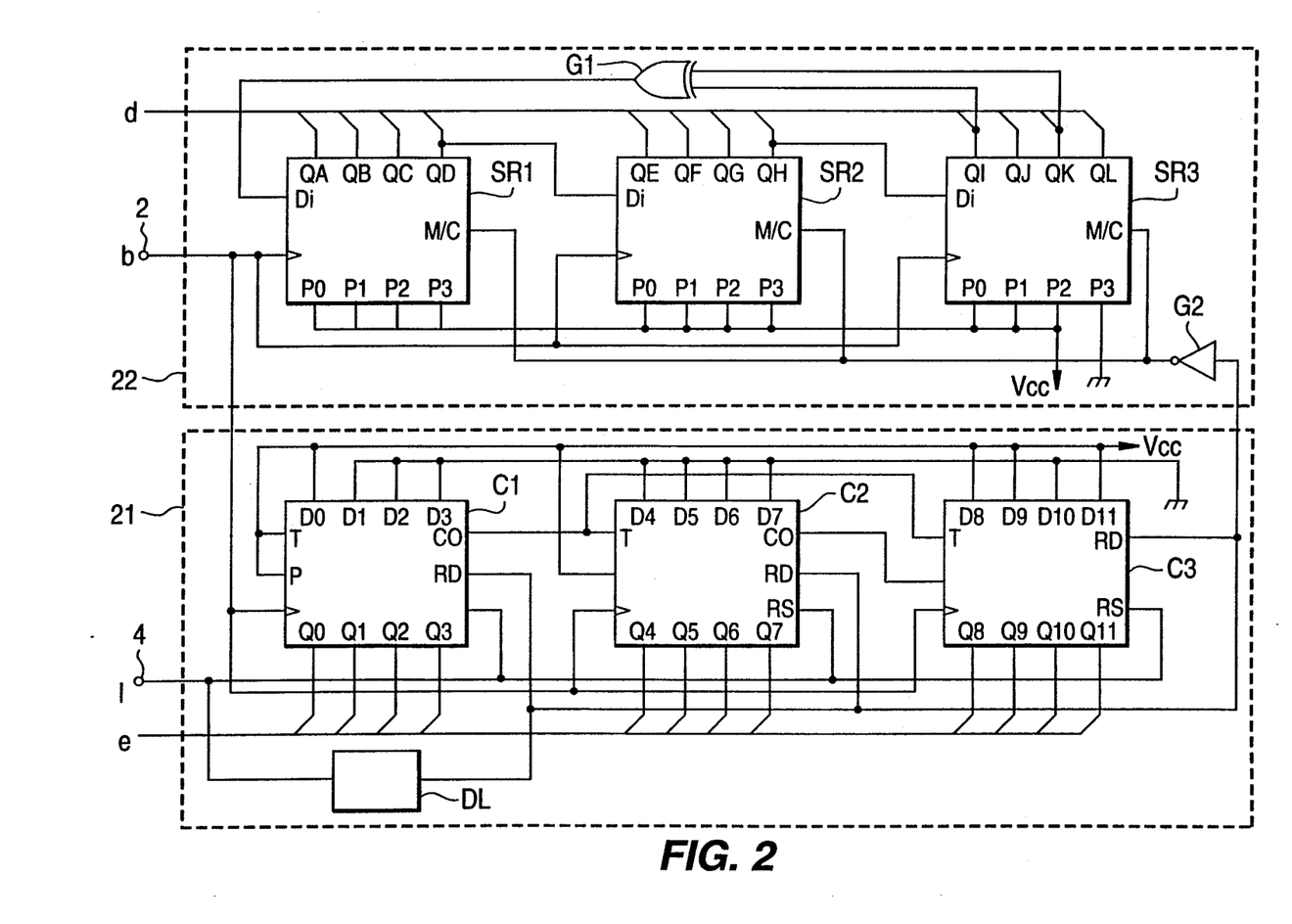
FIG. 2 is a detailed circuit diagram of a sequential address generator and a pseudo-random address generator of the present invention.

FIG. 2 is a detailed circuital illustration of the sequential address generator 21 and the pseudo-random address generator 22 of FIG. 1. The sequential address generator 21 includes serially connected load counters C1-C3, and a delaying device DL, while the pseudo random address generator 22 includes serially connected shift registers SR1-SR3, a gate G1 for returning a part of the outputs of the shift registers SR1-SR3 as input, and an inverter G2 for receiving an enable signal.

Figure 3A:
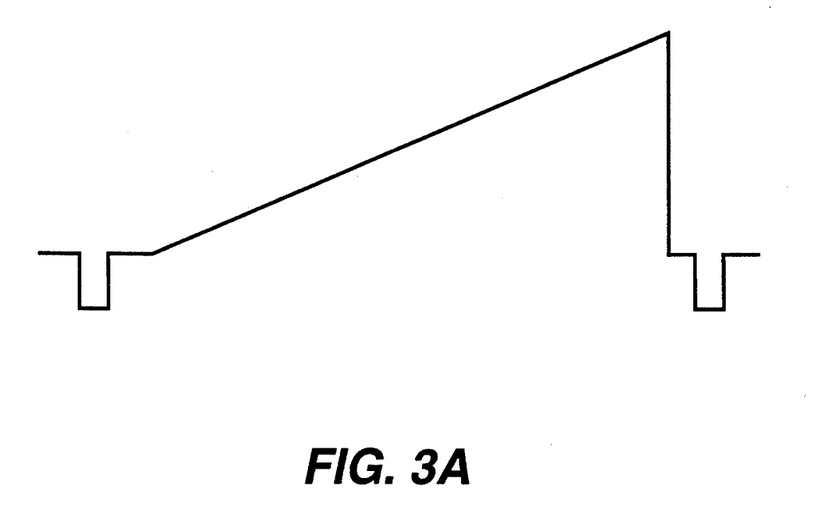
FIGS. 3A and 3B illustrate an embodiment of the present invention.
Figure 3B:
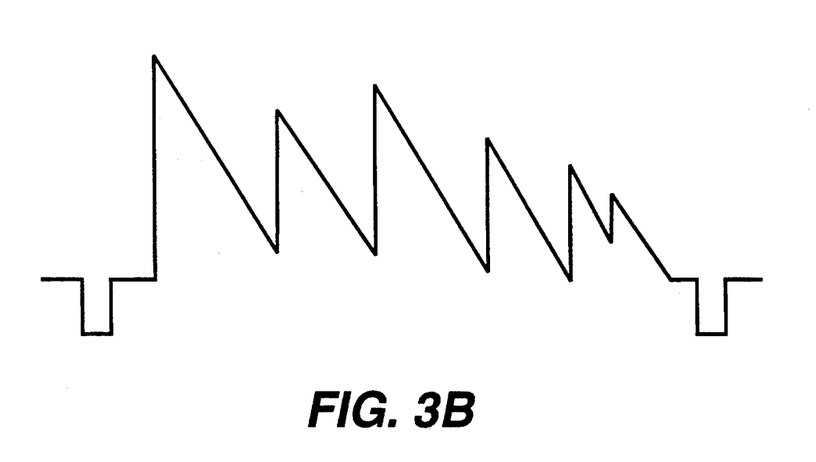

An embodiment of the present invention is illustrated in FIG. 3 in which FIG. 3A illustrates the input wave pattern, and FIG. 3B illustrates a scrambled wave pattern for the wave of FIG. 3A.

In the present invention as described above, the two memories 12, 13 alternately operate in such a manner that writings are carried out in a sequential manner, and readings are carried out in a random manner, thereby scrambling the input video signals as shown in FIG. 3.

Meanwhile, there is added a circuit for generating control signals for controlling the memories.

Now the embodiment of the present invention will be described in further detail, and first, the operation of the control section 20 will be described.

Figure 4:
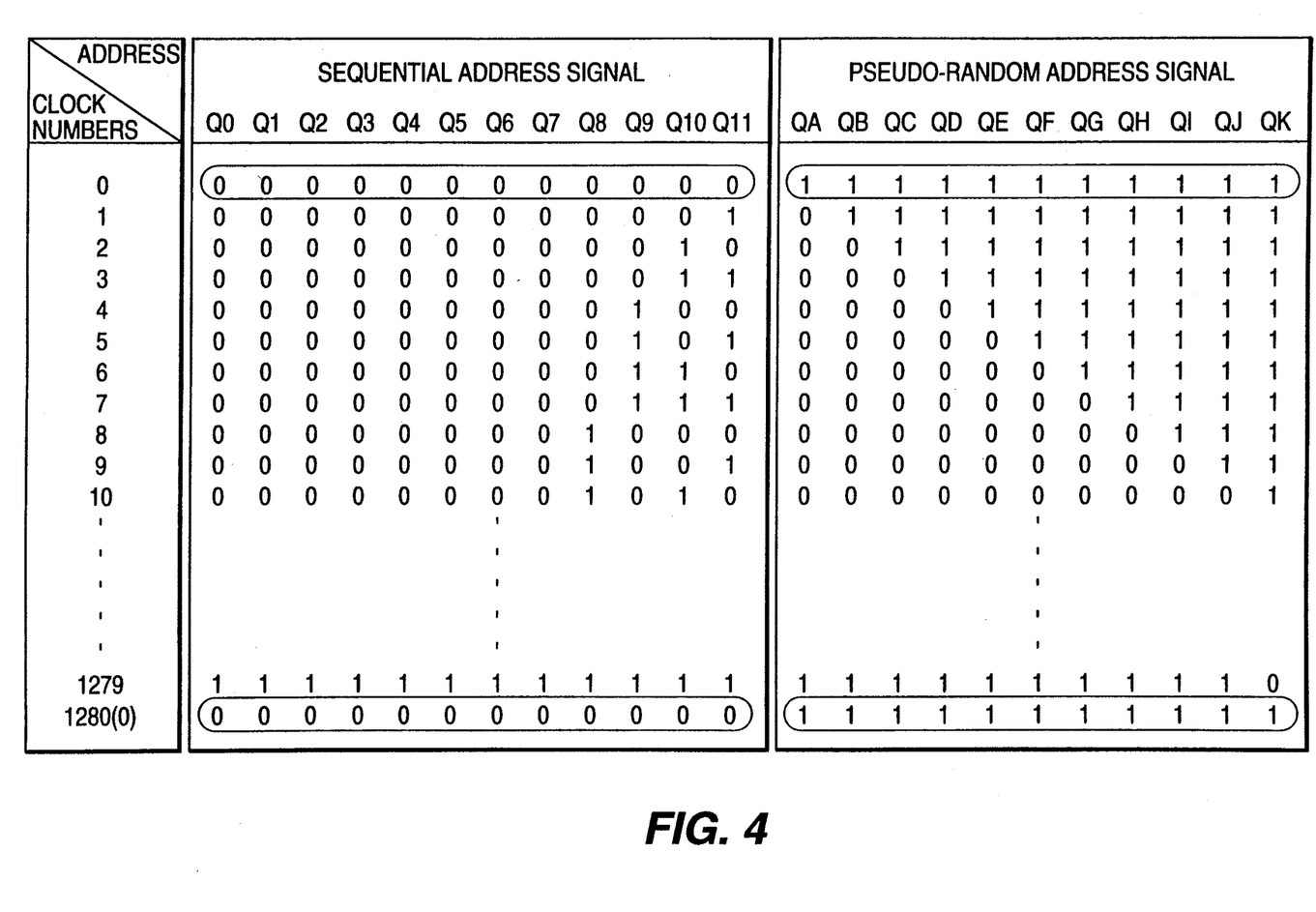
FIG. 4 illustrates output data of the generators of FIG. 2.

The clocks b which are input through the clock input terminal 2 are supplied to both the sequential address generator 21 and the pseudo random address generator 22. The horizontal synchronizing signal m which is input through the horizontal synchronization signal inputting terminal 4 is also supplied to the sequential address generator 21. The sequential address generator 21 includes load counters C1-C3 connected in series as shown in FIG. 2, and, upon supplying the clock, a counting is performed from 0 to 2, before outputting the sequential address signals e (generated therefrom) through output terminals Q0-Q11 in a sequential manner. Meanwhile, the horizontal synchronizing signals m are simultaneously supplied to the reset terminals RS of the load counters C1-C3 to be counted there with the period of one horizontal synchronizing signal span as the unit, and the load counter is reset at the time of inputting a horizontal synchronizing signal, thereby clearing all the outputs. Thus, the sequential address signal e which is output from the sequential address generator 21 becomes as shown in FIG. 4. Meanwhile, after being delayed at the sequential address generator 21, the horizontal synchronizing signal m is supplied also to the pseudo-random address generator 22, so that the pseudo-random address signal d should have a period corresponding to the segment span of the horizontal synchronizing signal. That is, they are commonly input into a mode control terminal M/C of the serially connected shift registers SR1-SR3, and thus, the initial value is loaded based on one horizontal synchronizing signal span, so that the pseudo-random address signal d should have the period of one horizontal synchronizing signal span.

The shift registers SR1-SR3 are all serially connected as described above, and therefore, the outputs are output starting from initial values P0-P11 in accordance with the input clock. A 9th bit Qi and an 11th bit Qk are mutually exclusively logic-added through the gate G1, and, if this value is re-input into the input terminal of the first shift register SR1, then a pseudo-random address signal d as shown in FIG. 4 is output through the output terminal QA-QL.

Such a sequential address signal e and a pseudo-random address signal d are simultaneously input to the first and second selecting means 23, 24, and they are output as first and second address signals g, h in a mutually exclusive form in accordance with the first and second control signals c, h which are read/write signals supplied to selected signal supplying terminals SEL1, SEL2. That is, the first and second control signals c,h are used by means of the selection control signals of the first and second selecting means 23,24, with the first control signal c being supplied to the first selecting means 23, and with the second control signal h being supplied to the second selecting means 24. Here, the second control signal h is an inverted form of the first control signal c, and therefore, if the first selecting means 23 selects and outputs the sequential address signal e, then the second selecting means 24 selects and outputs the pseudo-random address signal d.

The first and second address signals g,f and the first and second control signals c,h are all supplied to the signal holding and outputting section 10. Under this condition, the signal holding and outputting section 10 uses the first latch 11 to latch the video signals a which are supplied through the video signal input terminal 1, and then, the section 10 supplies the output to the first and second memories 13,12 simultaneously. Under this condition, the first address signal g and the first control signal c are supplied to the first memory 13, while the second address signal f and the second control signal h are supplied to the second memory 12. Therefore, the first and second memories 13,12 perform read/write operations in an alternate manner, and keeps a mutually exclusive state. Therefore, writings are sequentially carried out based on the period of one horizontal synchronizing signal span in accordance with the controls of the first and second address signals g,f and the first and second control signals c,h, while readings are carried out dummily and randomly. Thus, the arrangement of the input signals is altered to a random state along the time axis based on the unit of one horizontal span of the input signals.

Then, the outputs of the first and second memories 13,12 are subjected to timing corrections and wave pattern corrections by utilizing the second and third latches 14,15, and then, they are selected by the third selecting means 16, before being output.

Accordingly, if an input signal having the form of FIG. 3A is used, the output signal becomes like FIG. 3B, and therefore, even if noises are added during the transmission of the signals, if the signals are restored to the form of FIG. 3A upon receipt of them at the receiving end, then the added noises are dispersed, so that the actual TV picture should not be much affected by the noises, thereby making it possible to obtain a high quality picture.

According to the present invention as described above, even if noises are added during transmission of video signals, the noises are dispersed at the receiving end, thereby keeping the picture from being effected by the noises, and making it possible to obtain a high quality picture.

The invention is in no way limited to the embodiment described hereinabove. Various modifications of the disclosed embodiment as well as other embodiments of the invention will become apparent to persons skilled in the art upon reference to the description of the invention. It is, therefore, contemplated that the appended claims will cover any such modifications or embodiments as fall within the true scope of the invention.

What is claimed is:

1. A video data splitting circuit for removing noise during the transmission of video signals, comprising:
   control means for sequentially generating sequential address signals and pseudo-random address signals on the basis of a period of a horizontal synchronizing signal after being synchronized with a clock signal, for alternately selecting said sequential address signal and said pseudo-random address signal in accordance with first and second complementary control signals to simultaneously produce first and second address signals; and
   signal holding and outputting means coupled to receive video signals, for sequentially writing video signals onto a memory to provide stored video signals and for randomly reading and outputting stored video signals in a scrambled form in accordance with said first and second address signals and said first and second complementary control signals.

2. The video data splitting circuit as claimed in claim 1, wherein said control means comprises:
   sequentially address generator means for generating said sequential address signals in a sequential mode based on the period of horizontal synchronizing signal in accordance with said clock signal;
   pseudo-random address generator means for generating said pseudo-random address signals in a pseudo-random mode based on the period of said horizontal synchronizing signal in accordance with said clock signal;
   first selecting means for outputting said first address signal by selecting said sequential address signal and said pseudo-random address signal in accordance with said first control signal;
   inverter means for outputting said second control signal by inverting said first control signal; and
   second selecting means for outputting said second address signal by selecting said sequential address signal and said pseudo-random address signal in accordance with said second control signal.

3. The video data splitting circuit as claimed in claim 1, wherein said signal holding and outputting means comprises:
   first latch means for generating latched video signals by latching said video signals;
   first memory means for sequentially writing the latched video signals into designated addresses in accordance with said first control signal when said first address signal is sequentially generated by said control means, and for randomly reading the latched video signals stored in said designated addresses in accordance with said first control signal when said first address signal is randomly generated by said control means;
   third latch means for latching the output of said first memory means;
   second memory means for sequentially writing the latched video signals into designated addresses in accordance with said second control signal when said second address signal is sequentially generated by said control means, and for randomly reading the latched video signals stored in said designated addresses in accordance with said second control signal when said second address signal is randomly generated by said control means;
   second latch means for latching the output of said second memory means; and
   selecting means for selecting and outputting one of the outputs of said second and third latch means.

4. A video data splitting circuit for removing transmission noise, comprising:
   control means coupled to receive a clock signal and a horizontal synchronizing signal, for generating sequential address signals and pseudo-random address signals in synchronization with said clock signal based on a period of said horizontal synchronizing signal, for receiving a first control signal for inverting said first control signal to generate a second control signal, and for sequentially generating first and second address signals from said address signals and said pseudo-random address signals in response to said first and second control signals; and
   noise reducing means coupled to receive video signals for sequentially writing said video signals in synchronization with said clock signal based on the period of said horizontal synchronizing signal into designated addresses in accordance to said first and second control signals and said first and second address signals, and for randomly reading said video signals from said designated addresses to generate said video signals in a scrambled format.

5. The video data splitting circuit as claimed in claim 4, wherein said control means comprises:
   sequentially address generator means for receiving said horizontal synchronizing signal and said clock signal to generate said sequential address signals in synchronization with said horizontal synchronizing signal;
   pseudo-random address generator means for receiving said clock signal to randomly generate said pseudo-random address signals in synchronization with said horizontal synchronizing signal;
   first selecting means for selecting said sequential address signals and said pseudo-random address signals in response to said first control signal to generate said first address signal;
   inverting means for inverting said first control signal to generate said second control signal; and
   second selecting means for selecting said sequential address signals and said pseudo-random address signals in response to said second control signal to generate said second address 6. The video data splitting circuit as claimed in claim 4, wherein said signal reducing means comprises:
   first latch means coupled to receive said video signals, for latching said video signals to provide latch video signals;
   first memory means for sequentially writing said latch video signals into first addresses of said designated addresses in accordance with said first control signal when said first address signal is sequentially generated by said control means, and for randomly reading said latch video signals stored in said first addresses in accordance with said first control signal when said first address signal is randomly generated by said control means to provide first reproduced video signals;
   second latch means for latching said first reproduced video signals to perform timing corrections and wave pattern corrections for providing first intermediate signals;
   second memory means for sequentially writing said latch video signals into second addresses of said designated addresses in accordance with said second control signal when said second address signal is sequentially generated by said control means, and for randomly reading said latch video signals stored in said second addresses in accordance with said second control when said second address signal is randomly generated by said control means to provide second reproduced video signals;
   third latching means for latching said second reproduced video signals to perform timing corrections and wave pattern corrections for providing second intermediate signals; and
   selecting means for selecting between said first intermediate signals and said second intermediate signals to provide video signals in said scrambled format.

7. A method for minimizing transmission noise in video signals, comprising the steps of:
   receiving a clock signal and a horizontal synchronizing signal to generate sequential address signals in synchronization with said clock signal based on a period of said horizontal synchronizing signal;
   receiving said clock signal to randomly generate pseudo-random address signals in synchronization with said horizontal synchronizing signal;
   receiving a first control signal and inverting said first control signal to generate a second control signal;
   selecting said sequential address signals and said pseudo-random address signals in response to said first control signal to generate a first address signal;
   selecting said sequential address signals and said pseudo-random address signals in response to said second control signal to generate a second address signal;
   receiving video signals and latching said video signals to provide latch video signals;
   receiving said first address signal and sequentially writing said latch video signals into first designated addresses of a memory in accordance with said first control signal when said first address signal is sequentially generated, and for randomly reading said latch video signals from said designated addresses in accordance with said first control signal when said first address signal is randomly generated to provide first read signals;
   latching said first read signals to perform timing corrections and wave pattern corrections for providing first intermediate signals;
   receiving said second address signal and sequentially writing said latch video signals into second designated addresses of said memory in accordance with said second control signal when said second address signal is sequentially generated, and randomly reading said latch video signals from said second designated addresses in accordance with said second control when said second address signal is randomly generated to provide second read signals;
   latching said second read signals to perform timing corrections and wave pattern corrections to provide second intermediate signals; and
   selecting between said first intermediate signals and said second intermediate signals to provide video signals in said scrambled format.

8. A video data splitting circuit, comprising:
   means for receiving video signals;
   control means for controlling pseudo-random and sequential generation of first and second addresses signals in dependence upon synchronizing signals;
   first memory means having first designated addresses, for sequential writing said video signals into said first designated addresses and for randomly reading said video signals from said first designated addresses in dependence upon said first address signal to generate first reproduced video signals;
   second memory means having second designated addresses, for sequential writing said video signals into said second designated addresses and for randomly reading said video signals from said second designated addresses in dependence upon said second address signal to generate second reproduced video signals; and
   means for enabling transmission of one of said first and second reproduced video signals as video signals of a scrambled wave pattern.

9. The video data splitting circuit as claimed in claim 8, further comprised of means for latching said first and second reproduced video signals to perform timing corrections and wave pattern corrections for enabling transmission of said video signals of said scrambled wave pattern.

10. The video data splitting circuit as claimed in claim 8, wherein said control means comprises:
first generating means for generating sequential address signals in dependence upon said synchronizing signals and clock signals;
second generating means for generating pseudo-random address signals in dependence upon said synchronizing signals and said clock signals;
first selecting means for selecting said sequential address signals and said pseudo-random address signals in response to a first control signal to generate said first address signal;
inverting means for generating a second control signal by inverting said first control signal; and
second selecting means for selecting said sequential address signals and said pseudo-random address signals in response to said second control signal to generate said second address signal.

11. The video data splitting circuit as claimed in claim 8, wherein said control means comprises:
means for generating sequential address signals and pseudo-random address signals in dependence upon said synchronizing signals and clock signals; and
selecting means for generating said first address signals representative of one of said pseudo-random address signals and said sequential address signals in dependence upon a first control signal and for generating said second address signals representative of the other one of said pseudo-random address signals and said sequential address signals in dependence upon a second control signal complementary to said first control signal.

12. A video data splitting circuit, comprising:
means for receiving video signals of a standard wave pattern;
first generating means for sequentially generating sequential address signals in dependence upon synchronizing signals and clock signals;
second generating means for pseudo-randomly generating pseudo-random address signals in dependence upon said synchronizing signals and said clock signals;
selecting means for selecting said sequential address signals and said pseudo-random address signals to produce first and second address signals;
memory means for sequential writing said video signals into a plurality of addresses and for randomly reading said video signals from said plurality of addresses in dependence upon said first and second address signals to produce first and second reproduced video signals; and
means for enabling transmission of one of said first and second reproduced video signals as video signals of a scrambled wave pattern.

13. The video data splitting circuit as claimed in claim 12, further comprised of means for respectively latching said first and second reproduced video signals to perform timing corrections and wave pattern corrections for enabling transmission of said video signals of said scrambled wave pattern.

14. The video data splitting circuit as claimed in claim 12, wherein said selecting means produces said first address signals representative of one of said pseudo-random address signals and said sequential address signals in dependence upon a first control signal and produces said second address signals representative of the other one of said pseudo-random address signals and said sequential address signals in dependence upon a second control signal complementary to said first control signal.

15. The video data splitting circuit as claimed in claim 14, wherein said memory means sequentially writes said video signals of said standard wave pattern into first addresses of said plurality of addresses designated by said first address signals in dependence upon said first control signal, and randomly reads said video signals stored in said first addresses in dependence upon said first control signal.

16. The video data splitting circuit as claimed in claim 15, wherein said memory means sequentially writes said video signals of said standard wave pattern into second addresses of said plurality of addresses designated by said second address signals in dependence upon said second control signal, and randomly reads said video signals stored in said first addresses in dependence upon said second control signal.

17. The video data splitting circuit as claimed in claim 15, further comprised of means for respectively latching said first and second reproduced video signals to perform timing corrections and wave pattern corrections for enabling transmission of said video signals of said scrambled wave pattern.

18. The video data splitting circuit as claimed in claim 16, further comprised of means for latching said video signals of said standard wave pattern prior to the sequential writing of said video signals into the plurality of addresses of said memory means.

19. A method for minimizing transmission noise of video signals, comprising the steps of:
receiving video signals of a standard wave pattern;
sequentially generating sequential address signals and pseudo-randomly generating pseudo-random address signals in dependence upon synchronizing signals and and clock signals;
selecting said sequential address signals and said psuedo-random address signals to generate first and second address signals;
sequential writing said video signals into a plurality of addresses of a memory and for randomly reading said video signals from said plurality of addresses of said memory in dependence upon said first and second address signals to generate first and second reproduced video signals; and
enabling transmission of one of said first and second reproduced video signals as video signals of a scrambled wave pattern.

20. The method as claimed in claim 19, further comprised of steps of:
latching said video signals of said standard wave pattern prior to the sequential writing of said video signals into the plurality of addresses of said memory; and
respectively latching said first and second reproduced video signals to perform timing corrections and wave pattern corrections for enabling transmission of said video signals of said scrambled wave pattern.

* * * * *

UNITED STATES PATENT AND TRADEMARK OFFICE
CERTIFICATE OF CORRECTION

PATENT NO. : 5,327,239
DATED : 5 July 1994
INVENTOR(S) : Ki Bum Kim

It is certified that error appears in the above-indentified patent and that said Letters Patent is hereby corrected as shown below:

On the title page: Item

[75], Inventor's name,    change "Ki B. Kim" to -- Ki Bum Kim --.

Signed and Sealed this

First Day of April, 1997

Attest:

BRUCE LEHMAN

*Attesting Officer*    Commissioner of Patents and Trademarks